INVENTORS.
HOWARD L. LEDEEN
ELMER W. CHILDRESS
BY
Nilsson Robbins & Anderson
ATTORNEYS

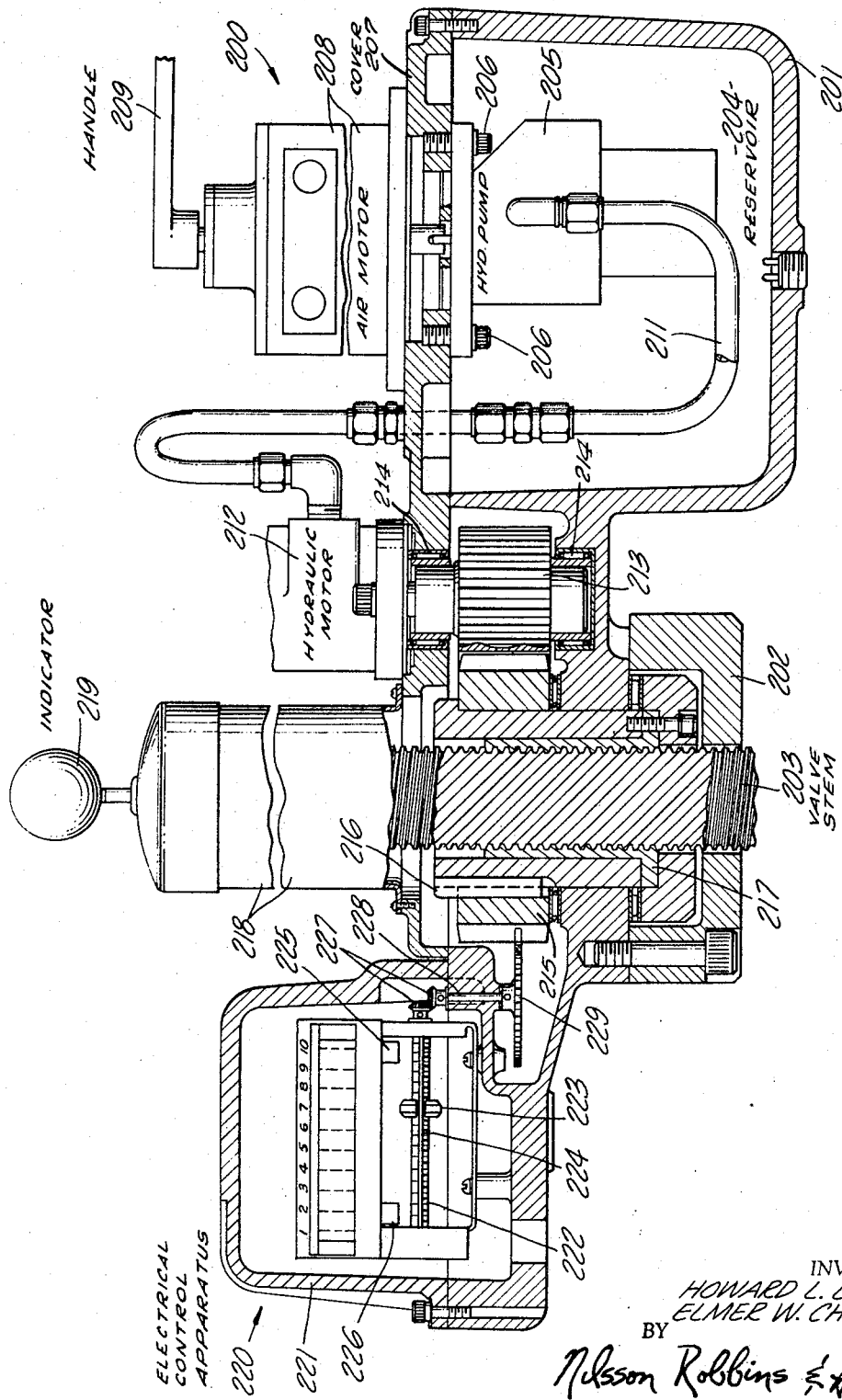

United States Patent Office 3,435,614
Patented Apr. 1, 1969

3,435,614
**SELF-CONTAINED HYDRAULIC
VALVE ACTUATOR**
Howard L. Ledeen, 4170 Commonwealth Ave., Pasadena,
Calif. 91103, and Elmer W. Childress, 7051 Vanscoy
St., North Hollywood, Calif. 91605
Filed Jan. 23, 1967, Ser. No. 610,958
Int. Cl. F15b 9/14, 21/02; F16h 39/50
U.S. Cl. 60—52                                11 Claims

ABSTRACT OF THE DISCLOSURE

This application discloses a remotely controllable actuator adapted for mounting on the housing of a valve; a rising stem type valve is shown. The actuator contains a prime power source which is a reversible motor driven by any energy source; compressed air is shown. The motor drives a reversible hydraulic pump which has its output connected to a reversible hydraulic motor. The hydraulic motor is connected through a gear train to the valve stem. Control circuits for starting and stopping the actuator are shown. Such circuits function in response to control signals emanating from any source such as a computer or manually operated control station. The controls include pressure relief valves interconnected in such manner along with time delay switches to effect positive closure of a valve by continuous operation of the hydraulic motor until pressure build up in the system reaches a predetermined point at which the valve must be closed.

Background of the invention

It has long been known to utilize valve actuating apparatus mechanically directly connected typically through a gear train to the valve stem to move the valve between open and closed positions. Although such apparatus operated exceedingly well, a number of serious problems were encountered. One of these problems was the requirement of imparting a "hammer blow" to the valve stem through the actuating apparatus to initiate the opening or closing cycle of the valve. That is, the actuating apparatus contained hammers thereon which traveled through a distance at a speed sufficient to generate a predetermined force and then contacted anvils formed on apparatus connected to the valve stem to impart the hammer blow, thus overcoming friction and inertia associated with the valve.

Another disadvantage found in prior art apparatus occurs upon seating of the valve during the closing cycle thereof. Typically, such prior art apparatus when power actuated, utilizes a worm gear arrangement to transmit power to the valve stem. A limit switch is typically actuated by travel through a predetermined distance of the worm. The limit switch controls the duration power is applied to the actuating apparatus. Valves of the type herein considered may become distorted through adverse operating conditions such as thermal contraction or expansion. Thus although the worm has traveled through the predetermined distance normally required to seat the valve, seating thereof is not assured as a result of such distortion.

Prior art gear train actuated apparatus generates large amounts of heat, necessitating an oil bath for the gear trains to both lubricate and dissipate the heat thus generated.

Summary of the invention

Accordingly, it is an object of the present invention to provide a valve actuating apparatus which is driven through a fluid connection between the prime mover and the valve stem.

It is another object of the present invention to provide apparatus which positively seats the valve being actuated under all conditions irrespective of distortion thereof.

It is a further object of the present invention to provide apparatus for actuating a valve which eliminates necessity of a gear train oil bath.

It is yet another object of the present invention to eliminate the necessity of hammer blow application to overcome friction and inertia in the valve being actuated.

It is still a further object of the present invention to provide a hydraulic valve actuating apparatus which is self-contained and adapted for mounting directly upon the valve in operative relationship with the valve stem.

It is still yet another object of the present invention to provide self-contained valve actuating apparatus having drive means coupled to the valve stem thereof in such a manner that side loading on the valve stem is eliminated.

Brief description of the drawing

Additional objects and advantages of the valve actuating apparatus constructed in accordance with the present invention will become apparent from a consideration of the following description taken in conjunction with the accompanying drawings which are presented by way of example only and are not intended as a limitation upon the scope of the present invention as defined in the appended claims and in which:

FIGURE 4 illustrates valve actuating apparatus constructed in accordance with the present invention shown partially in cross-section.

Self-contained valve actuating apparatus constructed in accordance with the present invention includes a housing means which supports a fluid pressure actuated drive means adapted for connection to the stem of a valve. Fluid pressure generating means is also supported by the housing and is coupled to the drive means while a pressure relief means is also coupled thereto.

Self-contained valve actuating apparatus constructed in accordance with a more specific aspect of the present invention includes a housing means defining a hydraulic fluid reservoir therein. A hydraulic pump means is mounted upon the housing means and communicates with the reservoir defined thereby. A bi-directional prime mover means is connected to the pump means and a hydraulic motor means is coupled to the hydraulic pump means. Control means is coupled between a source of energy and the prime mover means to selectively supply energy from the source to the prime mover means and to rotate the pump means in first and second directions to supply hydraulic fluid to the motor means. Drive means is engaged by the motor means and the valve stem so as to move the valve in closing and opening directions in response to the bi-directional movement of the prime mover and pump means.

Figures 1, 5:
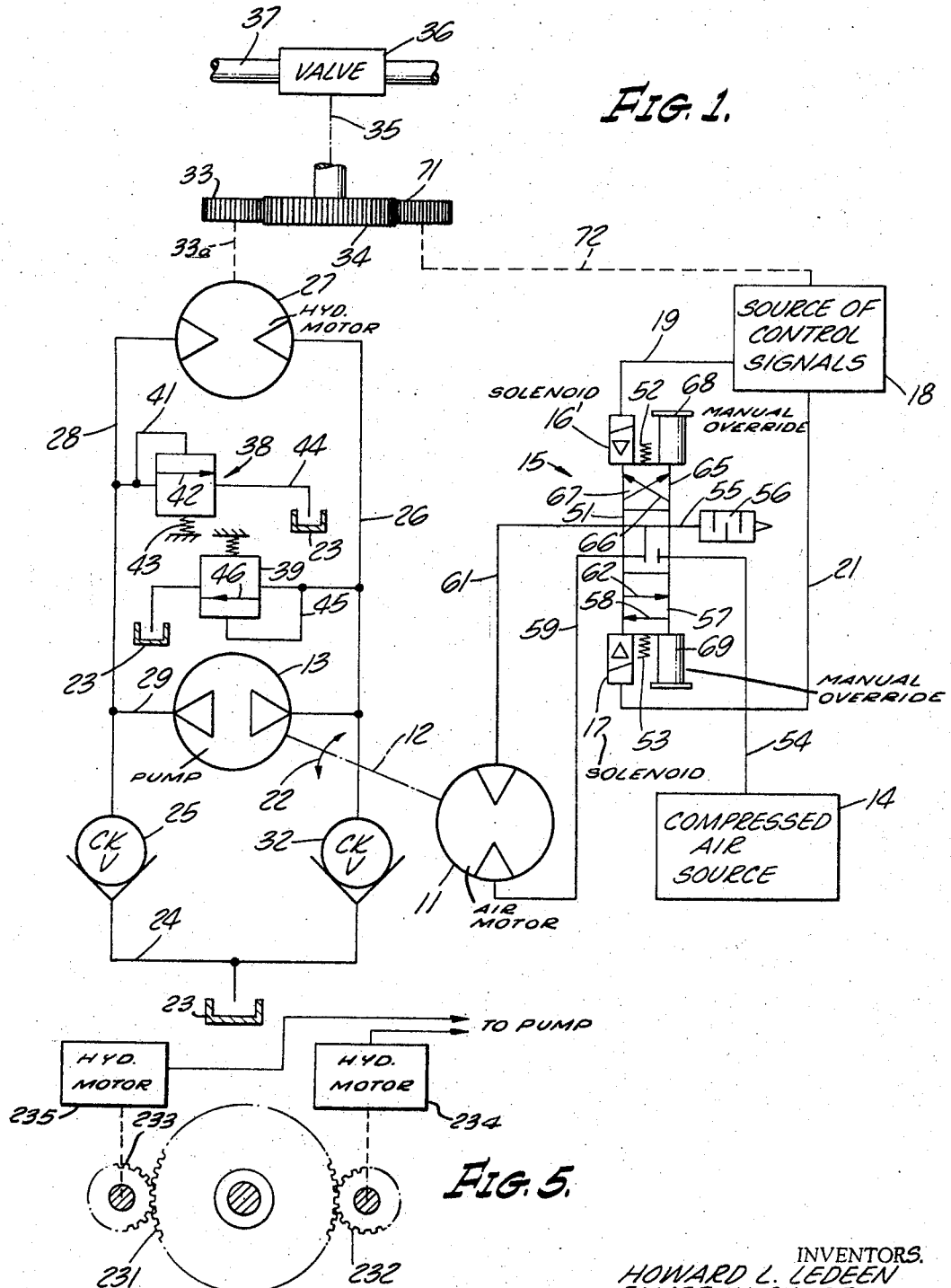
FIGURE 1 is a schematic diagram of a valve actuating apparatus constructed in accordance with the present invention.
FIGURE 5 is a fragmentary top elevational view partially in cross-section illustrating one form of connection between a valve stem and the actuating apparatus in accordance with the present invention.

Referring now to the drawings and more particularly to FIGURE 1 thereof, a system in accordance with the present invention is schematically illustrated. As is therein shown, fluid pressure generating means includes a bi-directional prime mover in the form of a reversible air motor 11 which is directly connected as shown by shaft 12 to a bi-directional hydraulic pump 13. A source of energy 14 such as compressed air is coupled by way of a control valve 15 to the air motor 11. The control valve 15 as illustrated is actuated by a pair of solenoids 16 and 17 which are energized from a source of control signals 18 applied respectively over the leads 19 and 21. Through actuation of the control means including the control valve 15 and the source of control signals 18, the compressed air is selectively applied to the reversible air motor 11 to cause it to rotate in first and second directions and to rotate the pump 13 also in first and second directions as indicated by the double-headed arrow 22. As the pump 13 rotates in a first direction, hydraulic fluid is supplied from a source 23 thereof through a conduit 24 and a first check valve 25 to a conduit 26 which is connected to a reversible hydraulic motor 27. The hydraulic fluid supplied by the pump 13 is exhausted from the motor 27 into conduit 28 and returns through the conduit 29 to the pump 13. It can thus be seen that a closed circulating system between the pump 13 and the motor 27 is supplied once sufficient hydraulic fluid has been obtained from the source 23 thereof to fill the conduits, the motor and the pump.

If the control means is reversed so as to supply compressed air to the reversible motor 11 causing it to rotate in the opposite direction and thus to drive the pump 13 in the opposite direction, hydraulic fluid is drawn by the pump 13 from the source 23 thereof and supplied through the conduit 24 and the check valve 32 to the system in such a manner that fluid under pressure is applied in the opposite direction, namely, through the conduit 29, the conduit 28 and to the motor 27 causing it to rotate in the direction opposite from that described above.

As the motor 27 rotates in either direction, a pinion gear 33 is driven through the shaft 33a connected between the gear 33 and the motor 27. The pinion drive gear 33 meshes with a bull gear 34 which is in turn connected as illustrated by the dashed line 35 to the stem of the valve 36. The valve 36 typically is disposed within a conduit 37 utilized for various purposes, such for example as the transmission of fluids such as gas, oil, or the like.

In the event the system stalls for any reason, such for example as freezing of the valve 36, an excessive pressure builds up in the conduits 26 or 28, depending upon the rotation of the pump 13 and the motor 27 in such a manner that relief valves 38 or 39 are activated. Referring, for example, to the relief valve 38, the pressure appearing in conduit 28 is applied through conduit 41 to open the valve as illustrated by the arrow 42 which is spring loaded to the position shown by the spring 43. The amount of pressure required to transpose the valve 42 to its open position is determined by the force applied by the spring 43 which typically can be adjusted to any desired amount. When such predetermined force is overcome by the pressure appearing in the conduit 41, the valve 42 is transposed so that it provides a direct connection from the conduit 28 through the valve 38 to an exhaust conduit 44 which is connected to the source 23 of hydraulic fluid.

Relief valve 39 functions not only in the manner described with respect to the relief valve 38 but also functions to assure positive seating of the valve 36 when it is driven into a closed position. In the event the control means is actuated so as to cause the pump 13 to supply fluid through the conduit 26 to the motor 27, the gear train consisting of the pinion drive gear 33 and the bull gear 34 is driven so as to close the valve 36. After the bull gear 34 has traveled a predetermined distance, nominally, a distance sufficient to close the valve 36, a signal is generated which initiates deactivation of the prime mover 11. Such signal may be generated, for example, by gear 71 meshed with and following bull gear 34 and through the connection 72 actuating switch means in the source of control signals. Such deactivation however, is delayed for a predetermined period of time sufficient to assure seating of the valve 36. During this time delay the motor 27 continues to attempt to drive the valve stem in a closing direction, until the pressure appearing in the conduit 26 exceeds an amount which provides absolute assurance that the valve 36 has totally seated. When the pressure in the conduit 26 reaches the desired point, the relief valve 39 is opened through application of the pressure by way of the conduit 45 to the valve 39 causing it to transpose so as to shunt the hydraulic fluid appearing in the conduit 26 from the motor 27 through the passage 46 in valve 39 to the source of fluid 23. Thus there is at all times provided a positive pressure seating irrespective of travel of the gearing means 34 so that positive seating of the valve 36 in the closing direction occurs.

As is illustrated, the control valve 15 includes a three position slide valve 51 which in its neutral position as shown is centered by springs 52 and 53. In its neutral position the input energy to the motor 11 from compressed air source 14 is blocked at the valve 51 and the opposite sides of motor 11 are connected to exhaust through passages 59, 61, un-numbered connecting passages within valve 51 in its neutral position, exhaust line 55 and the muffler 56 connected thereto. If, however, the solenoid 17 is energized by a signal from the source of control signals 18 applied through the lead 21 the valve 15 is transposed from its neutral position into its first operating position shown at 57 by moving upwardly as viewed in FIGURE 1. As is illustrated by the arrows appearing in the first position 57, the air from the source 14 is coupled from the conduit 54 through the port 58 to the conduit 59 to rotate the motor 11 and the pump 13 in its first direction. The exhaust air from the motor 11 is transmitted through the conduit 61, the port 62 and the conduit 55 to the muffler 56.

Alternatively if the solenoid 16 is energized the valve 15 moves downwardly so that its second operating position as shown at 65 couples the conduit 54 through the port 66 and the conduit 61 to the opposite side of the reversible motor 11, the exhaust being connected by the conduit 59 through the port 67 to the conduit 55 and the muffler 56. Thus the reversible air motor 11 is driven in a first direction when the valve 15 is in its first operating position and is driven in a second direction when the valve 15 is in its second operating position. The particular position occupied by the valve 15 is controlled by the source of control signals 18 as will be described more fully hereinafter. Alternatively there are provided manual override buttons 68 and 69 which may be operated by a manual manipulation in the event a loss of control signals occurs.

There may also be provided a feedback arrangement to indicate when the valve 36 has been manipulated through a complete open or a complete closed cycle. Such feedback apparatus may take any form desired, for example such as the gear 71 which meshes with the bull gear 34 and is connected as indicated by the dashed line 72 and above referred to. The gear 71 may, for example, drive appropriate apparatus designed to actuate limit switches or the like positioned on the apparatus or located in the source of control signals 18.

Referring now to FIGURE 2, one form of control circuit which may be utilized in conjunction with the apparatus illustrated schematically in FIGURE 1 is shown. As is therein illustrated, a latching bi-stable relay 81 having coils 82 and 83 is provided. As is well known in the art, a bi-stable latching relay is one which when energized by a signal applied to its coils transfers its contacts to the opposite position from that which was occupied at the time the coil is energized. The contacts remain in that position until the coils are again energized at which time the contacts return to their original position. Alternatively one may apply the signal selectively to each of the coils 82–83 to effect a selective transfer from one bi-stable position to the opposite bi-stable position.

Figure 2A:
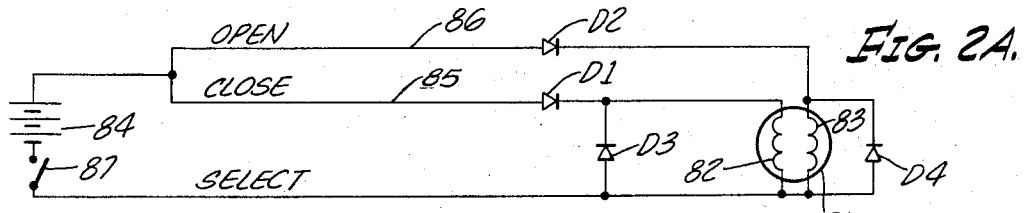
FIGURES 2A, 2B and 2C are schematic diagrams of an electrical control circuit for use in conjunction with the circuit illustrated in FIGURE 1.

As is illustrated in FIGURE 2A a source of voltage 84 is continuously connected through leads 85 and 86 respectively to the coils 82 and 83 of the latching relay 81 thus energizing both coils simultaneously. Diodes D1 and D2 are utilized to prevent inductive kick voltage from being transmitted through the lines 85 and 86 to the source 84 of voltage. Switch 87 is connected from the opposite terminal of the source 84 to the opposite terminals of the coils 82 and 83. So long as the switch 87 remains in in its open position, no energy is applied to the coils 82 and 83 of the relay 81. The diodes D3 and D4 are utilized to preclude application of the inductive kick voltage to the coils 82 and 83 upon de-energization thereof, as is well known in the prior art.

Figure 2C:
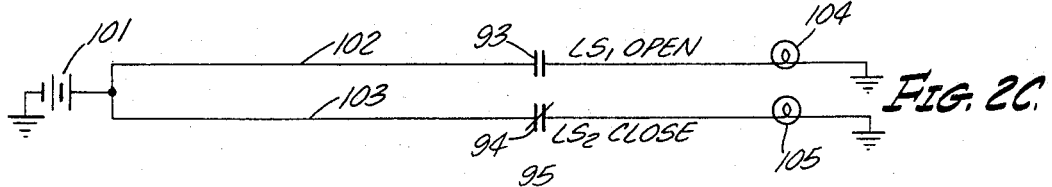
Figure 2B:
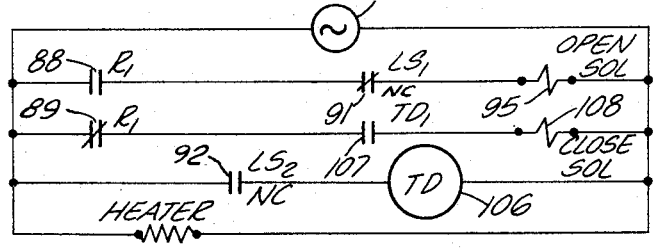

In FIGURE 2B, the various contacts are shown for the valve 36 being in its closed position. As shown the latching relay 81 contacts 88 and 89 (also designated R1) are in the open and closed position respectively. Limit switches are also utilized and are designated in FIGURE 2 $LS_1$ and $LS_2$. The limit switch $LS_1$ is actuated when the valve has traveled to its full open position and the limit switch $LS_2$ is actuated when the valve has traveled to its full closed position. Again the contacts of the limit switches $LS_1$ and $LS_2$ are illustrated respectively at 91 and 92 in FIGURE 2B in the closed and open position. The designation NC adjacent the contacts 91 and 92 indicates such contacts are normally closed but are each opened by actuation of the respective limit switch. A source of potential such as an alternating current generator 95 is connected across the control circuit shown in FIGURE 2B.

As shown in FIGURE 2C, a position indicator is provided for the operator. Such indicator is connected to one terminal of a source 101 of voltage, the opposite terminal thereof being connected to ground. The lead 102 is connected through contacts 93 (normally open) of the limit switch $LS_1$ to an indicator such as a pilot light 104 which is also connected to ground. Lead 103 is connected through contacts 94 (normally open) of limit switch $LS_2$ through a pilot lamp 105 which is also connected to ground. Thus when contacts 93 or 94 are closed by their respective limit switches being actuated as above described, the lamps 104 or 105 respectively are energized, indicating to the operator the position of the valve. Thus in the position illustrated in FIGURE 2C, limit switch $LS_2$ contacts 94 are closed and the lamp 105 is energized showing the valve 36 is closed.

Assuming the condition of the circuit as above described, and that the switch 87 is momentarily closed, for example on the order of 20 milliseconds or the like, a voltage is applied from the source 84 simultaneously to both coils 82 and 83 of the latching relay 81. Under these conditions the contacts 88 of the relay become closed and the contacts 89 become open, that is, they reverse the positions they previously occupied and remain there. Upon closing of the contacts 88 of the latching relay 81, the source 95 of voltage has a complete circuit through the contacts 88, the contacts 91 of the limit switch $LS_1$ to the coil 95 of the open solenoid, for example to solenoid 17 (FIGURE 1).

By energizing the coil 95 of the solenoid 17 valve 15 is transposed so the air motor 11 (FIGURE 1) is driven in such a direction as to open the valve 36. The air motor turns continuously in this direction thus driving the pump 13 and the hydraulic motor 27 in the desired direction until the bull gear 34 has driven the feedback gear 71 a distance sufficient to actuate the limit switch $LS_1$. When this occurs, the contacts 91 of the limit switch $LS_1$ are opened, thus de-energizing the coil 95 of the solenoid 17. When the coil 95 was first energized and the motor 27 began to turn, the contacts 94 of the limit switch $LS_2$ became open thus causing the lamp 105 to become extinguished. When the limit switch $LS_1$ contacts 91 were opened, simultaneously the contacts 93 thereof were closed and the lamp 105 was energized, thus indicating to the operator that the valve 36 (FIGURE 1) had then been fully opened. It should also be noted that as the motor 27 first began to turn the limit switch $LS_2$ contacts 92 became closed thus completing the circuit from the source 95 and applying power to the time delay relay TD 106. Upon application of power to the relay 106 the contacts 107 thereof become closed.

Assuming now for illustration of the opposite or closing direction of operation that a momentary pulse, again on the order of 20 milliseconds, is applied by closing the switch 87. When this occurs energy is applied simultaneously to the coils 82 and 83 of the relay 81 thus causing its contacts to assume the position opposite from that previously occupied. That is, the relay 81 contacts 88 open and contacts 89 close. Since the contacts 107 of the time delay relay 106 were previously closed, energy is now applied to the coil 108 of the close solenoid, for example solenoid 16. Upon application of power to the solenoid 16 valve 15 is transposed so the air motor 11 is rotated in the opposite direction, thus driving the pump 13 and the motor 27 in the opposite direction to cause the valve 36 to go through its closing cycle. As the bull gear 34 drives the valve into the closed position the gear 71 actuates the feedback mechanism and when the valve has traveled through a predetermined distance the limit switch $LS_2$ is actuated. Under these conditions the contacts 92 are opened thus removing the source of power 95 from the time delay relay 106 and closing the contacts 94 thus energizing the lamp 105, the lamp 104 having become de-energized immediately upon the motor 27 starting to turn in the closing direction.

Even though the contacts 92 remove power from the time delay relay 106, the contacts 107 thereof remain closed for a predetermined period of time thereafter. Thus even though feedback information is provided indicating that the power has been applied by way of the hydraulic motor 27 to turn the bull gear 34 through a distance sufficient to close the valve, power is continuously applied for a predetermined period of time thereafter, such for example as five seconds. During this period of time the motor 11 continuously drives the pump 13 in a direction such as to apply fluid to motor 27 under pressure causing it to turn in a direction to close the valve 36. If the valve 36 has in fact already become closed and fully seated, additional pressure begins to build up in the hydraulic conduit 26 leading to the motor 27. When the pressure appearing in the line 26 reaches a predetermined amount, the relief valve 39 operates in the manner described above, thus shunting the hydraulic fluid to the reservoir 23 therefor. It can thus be seen that even though the gear has traveled as indicated by limit switches through a given distance, additional power is applied thereafter to assure seating of the valve even under adverse operating conditions.

It has from time to time been found desirable to have the capacity to stop the valve at any given position between the open and closed points. Such capability is needed, for example, in those instances where fluids flowing through a conduit or pipeline controlled by a given valve are being mixed in given proportions with fluids flowing through other valves.

Figure 3A:
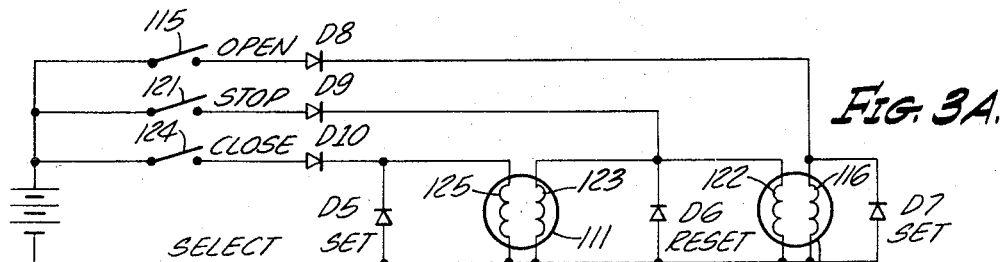
FIGURES 3A, 3B and 3C are schematic diagrams of an alternative electrical control circuit for use in conjunction with the apparatus illustrated in FIGURE 1.
Figure 3C:
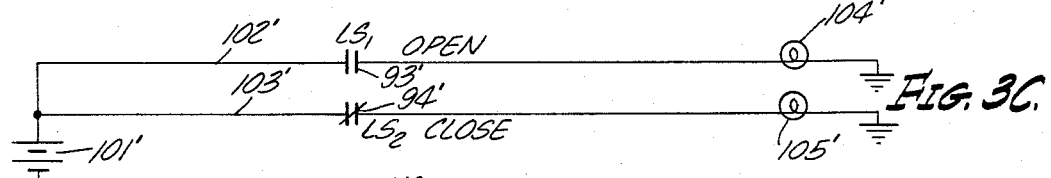

By reference now to FIGURE 3, a control circuit for accomplishing this capability is illustrated. Parts of the circuit shown in FIGURE 3 are identical to those shown in FIGURE 2, for example, the indicator lamp portions, and are so indicated by the use of the same numerals primed and will not be described herein. A description of the operation of the circuit shown in FIGURE 3 during which the various components of the circuit will be described is deemed sufficient in view of the previous discussion of the circuit of FIGURE 2.

Figure 3B:
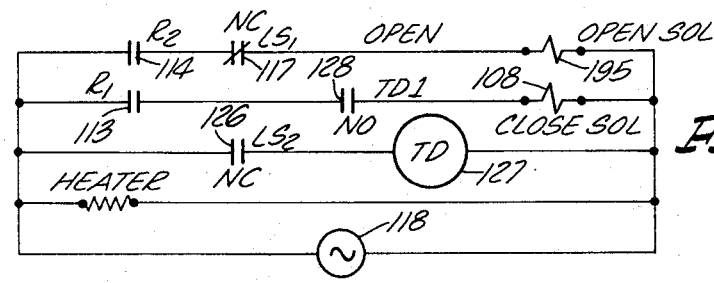

As is shown, two latching relays 111 and 112 are utilized. Diodes D5 through D7 are used to protect the relay coils while diodes D8 through D10 are used to preclude the possibility of inductive kick voltage being returned through the line to the control apparatus. The position of the various contacts shown in FIGURE 3B are such that the valve 36 is in a closed position with the exception that the relays R1 and R2 have been returned to a quiescent or reset position, such that the contacts 113 and 114, respectively, thereof are in the open condition. Under these circumstances, by momentarily closing the switch 115 a signal is applied to the coil 116 of the relay 112. Such signal causes the contacts 114 of the relay 112 to close. Since the contacts 117 of the limit switch $LS_1$ are already in the closed position, a circuit is completed for the source 118 of voltage through the contacts 114, the contacts 117, to the coil 95 of the open solenoid 17 (FIGURE 1) above described. The air motor 11 then turns the pump 13 which in turn supplies hydraulic fluid to turn the motor 27 in a direction such that valve 36 is driven through its open cycle until the limit switch $LS_1$ contacts 117 are opened thus removing power from the coil 95 of the solenoid 17. At this point in time the contacts 93' of the limit switch $LS_1$ are also closed thus energizing the lamp 104'. When the lamp 104' is energized, the operator pushes the stop switch 121 to apply momentarily a signal to the coil 122 of the relay 112 thus causing the contacts 114 thereof to return to the open position. It should also be noted that each time the stop switch 121 is energized a signal is simultaneously also applied to the coil 123 of the relay 111. Thus each time the stop switch 121 is energized each of the latching relays 111 and 112 are returned to their quiescent or open contact positions.

Assuming now that it is desired to close the valve, the switch 124 is energized momentarily, thus applying a signal to the coil 125 of the latching relay 111. This signal causes the contacts 113 of the relay 111 to close. The contacts 126 of the limit switch $LS_2$ are normally closed, thus having power applied to the time delay relay 127 causing its contacts 128 also to become closed. Since the contacts 128 are closed a circuit is completed from the source of voltage 118 to the solenoid 16 coil 108 which is the close solenoid (FIGURE 1). Power is applied by way of the motor 27 to cause the valve 36 to go through its closing cycle. If the valve is permitted to go through its entire closing cycle the operation is as above described in that the limit switch $LS_2$ has its contacts 126 opened at the end of the predetermined travel of the switch. However, the contacts 128 of the time delay relay 127 remain closed for a period sufficient to assure seating by causing the pressure appearing in the line to become sufficient to energize the pressure relief valve 39 as above described.

However, in either the open or the closed cycles it often becomes desirable to stop the valve in a mid-position as above indicated. When such is desired, the operator merely energizes the stop function by momentarily depressing switch 121 which applies voltage to energize the coils 122 and 123 of the relays 112 and 111 respectively. When such occurs, the contacts 113 and 114 open thus reopening the circuits to the solenoid coils 108 and 195 respectively. Thus even though the valve may be in its closing or opening cycle it may be stopped at any given position by merely depressing the stop switch 121. Thereafter, the opening in the valve may be changed by either energizing the open or close switches 115 and 124 as desired. One of the important features which must be remembered is that at the end of any desired movement of the valve either through a complete cycle or to some mid-position, the stop switch 121 must be momentarily energized to return the latching relays 111 and 112 to their quiescent position thereby placing the contacts 113 and 114 thereof in the open position. By so doing the apparatus is then in a position such that it can receive the next command signal and perform the function desired at that point in time.

The source of control signals 18 (FIGURE 1) may take various forms. For example, the apparatus above described may be one of a plurality thereof all attached to valves in a processing plant. The processes may be computer controlled and the open-close-stop signals generated by the computer. Alternatively, of course, an operator may physically actuate the various controls located on an instrument panel in a control console. For the sake of brevity of description the control apparatus has been schematically illustrated and such illustration is to be taken to include such various forms of control signal sources.

From the foregoing description it should become obvious that the actuating apparatus in accordance with the present invention may take any form which is desired, so long as the same is housed within a self-contained apparatus adapted for attachment to the housing of a valve. However, by reference to FIGURE 4, there is therein shown a preferred form of the apparatus. As is therein illustrated a housing shown generally at 200 includes a base 201 which is arranged and adapted to receive a valve housing mounting adapter 202 which is utilized to attach the actuating apparatus in accordance with the present invention to the housing of a valve (not shown), the stem 203 of which is shown in operable position affixed to the apparatus in accordance with the present invention. The base 201 defines a reservoir 204 within which there is contained hydraulic fluid. Also within the reservoir there is mounted a hydraulic pump 205 which is affixed by any means desired such as bolts 206 to a cover 207 for the base 201. Mounted upon the top of the cover 207 is a prime mover apparatus such, for example, as an air motor 208. Affixed to the air motor is a manually operable handle 209 which can be utilized to manually operate the valve in the event of failure of a source of energy such, for example, as the compressed air. Under these circumstances the handle 209 can be actuated by the operator to drive the pump 205. Conduit means 211 is connected between the pump 205 and a hydraulic motor 212 which is also affixed to the top of the cover 207 as illustrated. The motor 212 has a gear means 213 affixed thereto. The gear means is supported within bearings 214 as is well known in the prior art. The gear means 213 meshes with a bull gear 215 that is affixed by way of a key 216 to the internally threaded bull gear sleeve 217 which engages the threads on the shaft 203 to drive the same. A dust cover 218 and a visual indicator 219 are affixed over the area within which the stem 203 is housed to protect the same from foreign substances and to provide a visual indication of operation where such is desired.

Electrical control apparatus 220 is also mounted upon the base 201 and is covered by an explosion-proof cover 221. Set within the cover 221 is a control apparatus which includes a lead screw 222 having a traveling nut 223 threadably affixed thereto and restrained from rotation by a rod 224. Limit switches 225 and 226 are arranged at each end of the lead screw 222 and are actuated by the traveling nut 223 contacting the same. The nut 223 is caused to travel through rotation of the lead screw 222 being actuated by bevel gears 227 which are driven through shaft 228 which is affixed to a pinion gear 229 which meshes with the bull gear 215. In this manner as the bull gear turns thus actuating the pinion gear 229, the lead screw 222 is rotated causing the traveling nut 223 to reciprocate along the longitudinal axis of the lead screw actuating the limit switches 225 and 226 causing operation of the electrical circuit as above described in connection with FIGURES 2 and 3.

The motor 212 may take any form desired for any particular application utilizing apparatus in accordance with the present invention. It has however been found that a motor having low output speed with high torque is preferable. Such a motor is described in Patent No. Re. 25,291 issued Dec. 4, 1962, and therefore detailed description and illustration thereof is not deemed necessary. The air motor and hydraulic pump again may be any desired and since there are many commercially available air motors and pumps which are bi-directional, it is not deemed necessary to describe the same in any further detail herein. For example, the pump may be a variable displacement pump such that the flow and pressure of fluid is determined by the load demanded from the motor. Such pumps are known to the prior art.

Under certain operating conditions the side thrust applied by the gearing mechanism at the output of the motor being in engagement with the bull gear 215 is not desirable. This would particularly be so in the event of a relatively heavy load. Under such circumstances the bull gear can be driven by separate gears coming into contact with the same at equally angularly displaced positions about the periphery thereof.

Such an arrangement as immediately above described is illustrated by reference to FIGURE 5. As is therein shown a bull gear 231 has two drive spur gears disposed 180° apart as shown at 232 and 233, the bull gear being affixed in such a manner as to drive the stem of a valve as above described. It should become obvious to those skilled in the art that the pinion gears 232 and 233 may be driven by separate hydraulic motors as shown at 234 and 235 or may alternatively be driven through gear trains connected to a single hydraulic motor if such should be desired. The important feature herein is that the drive pinion gears 232 and 233 are engaged with the bull gear 231 at equally angularly displaced positions about the periphery of the bull gear 231. Therefore any number may be utilized so long as this relationship is maintained.

Although a specific embodiment of a self-contained valve actuating apparatus has been described in some detail herein, such is not to be taken by way of limitation but rather by way of illustration and example only. The invention is to be measured by the claims appended hereto.

What is claimed is:
1. Self-contained valve actuating apparatus adapted for mounting upon a valve housing and connection with the stem of a valve to move the valve through opening and closing cycles comprising:
   housing means;
   fluid actuated drive means carried by said housing means and adapted for connection to said valve stem;
   fluid pressure generating means supported by said housing means and coupled to said drive means;
   first and second switch means coupled to said drive means to de-energize said drive means when said valve has completed movement through its opening and closing cycles respectively;
   and third switch means by passing said second switch means and maintaining said drive means energized for a predetermined time after said second switch means is actuated thereby to assure said valve has fully closed and seated.

2. Self-contained valve actuating apparatus as defined in claim 1 which further includes a source of control signals and wherein said fluid pressure generating means includes,
   a bi-directional rotation prime mover means and pump means intercoupled and switch means connected between said prime mover means and said source of control signals to control the direction of rotation of said prime mover means.

3. Self-contained valve actuating apparatus as defined in claim 2 wherein said prime mover means is a pneumatic motor and said switch means is a three position solenoid actuated valve, said pneumatic motor being rotated in first and second directions when said solenoid actuated valve is in first and second operating positions, respectively, and being non-rotating when said solenoid actuated valve is in its third position.

4. Self-contained bi-directional valve actuating apparatus adapted for mounting directly upon a valve in operative relationship with the valve stem thereof, said apparatus comprising;
   housing means defining a hydraulic fluid reservoir;
   bi-directional prime mover means, hydraulic pump means, and hydraulic motor means mounted upon said housing, means, said pump means communicating with said reservoir,
      said prime mover means and said pump means being mechanically intercoupled,
      said pump means and said motor means being hydraulically intercoupled,
   control means for selectively coupling energy from a source thereof to said prime mover means to rotate said prime mover means and said pump means in first and second directions thereby to supply hydraulic fluid to said motor means to move the same in first and second directions;
   and drive means for coupling said motor means to said valve stem to move said valve in a closing direction when said motor is moving in said first direction and to move said valve in an opening direction when said motor is moving in said second direction.

5. Self-contained apparatus as defined in claim 4 wherein said control means includes first switch means automatically de-energizing said prime mover means upon said valve stem travelling through a predetermined distance in the opening direction and second switch means automatically de-energizing said prime mover means only after a predetermined delay after said valve stem travels through a predetermined distance in the closing direction.

6. Self-contained apparatus as defined in claim 4 wherein said prime mover is a pneumatic motor and said source of energy is compressed air, and said control means includes control valve means coupling said compressed air to said pneumatic motor and a source of control signals coupled to said control valve means.

7. Self-contained apparatus as defined in claim 4 which further includes relief valve means coupled to shunt fluid from said motor means only when said valve has been moving in a closing direction and the input fluid pressure to said motor means exceeds that pressure required to positively seat said valve in a closed position.

8. Self-contained apparatus as defined in claim 7 wherein said hydraulic intercoupling between said pump means and said motor means is defined by a closed conduit system circulating hydraulic fluid between said pump means and said motor means, said pump means drawing hydraulic fluid from said reservoir only to replenish losses in said system from leakage and shunting.

9. Self-contained apparatus as defined in claim 4 wherein said drive means includes a bull gear adapted for coupling to said valve stem and a plurality of pinion gears coupled to said hydraulic motor means and drivingly engaging said bull gear at angularly spaced points.

10. Self-contained apparatus as defined in claim 9 wherein said hydraulic motor means is a plurality of individual hydraulic motors each coupled to said pump means and each connected to a separate one of said pinion gears.

11. Self-contained apparatus as defined in claim 6 which further includes means for manually energizing said pump means mechanically interconnected with said prime mover means and extending externally of said housing.

References Cited

UNITED STATES PATENTS

| | | |
|---|---|---|
| 2,748,569 | 6/1956 | Jackson. |
| 2,938,347 | 5/1960 | Sturgis _____ 60—51 |
| 2,942,581 | 6/1960 | Gaffney. |
| 2,984,985 | 5/1961 | MacMillin. |
| 3,084,513 | 4/1963 | Casassa et al. |
| 3,120,103 | 2/1964 | Beard et al. |
| 3,360,930 | 1/1968 | Haag. |

EDGAR W. GEOGHEGAN, *Primary Examiner.*

U.S. Cl. X.R.

91—361